US007687927B2

(12) United States Patent
Shander et al.

(10) Patent No.: US 7,687,927 B2
(45) Date of Patent: Mar. 30, 2010

(54) ELECTRICAL SYSTEMS ARCHITECTURE FOR AN AIRCRAFT, AND RELATED OPERATING METHODS

(75) Inventors: Mark S. Shander, Mill Creek, WA (US); Richard A. Cote, Mill Creek, WA (US); Michael L. Drake, Bellevue, WA (US); Howard Carter, III, Chesterfield, MO (US); John T. Peters, Edmonds, WA (US); Casey Y. K. Ng, Sammamish, WA (US); Michael S. Hoag, Kent, WA (US); John T. Paterson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/944,199

(22) Filed: Nov. 21, 2007

(65) Prior Publication Data

US 2009/0127855 A1  May 21, 2009

(51) Int. Cl.
*H02K 7/00* (2006.01)
(52) U.S. Cl. .......................................................... 290/7
(58) Field of Classification Search ................... 290/7
See application file for complete search history.

(56) References Cited

U.S. PATENT DOCUMENTS

| | | |
|---|---|---|
| 2,777,301 A | 1/1957 | Kuhn |
| 2,960,825 A | 11/1960 | Sampietro |
| 3,057,170 A | 10/1962 | Brahm |
| 3,060,684 A | 10/1962 | Holmes |
| 3,105,631 A | 10/1963 | Hahny |
| 3,177,679 A | 4/1965 | Quick |
| 3,194,026 A | 7/1965 | La Fluer |
| 3,321,930 A | 5/1967 | La Fluer |
| 3,683,749 A | 8/1972 | Bayles |
| 4,091,613 A | 5/1978 | Young |
| 4,312,191 A | 1/1982 | Biagini |

(Continued)

FOREIGN PATENT DOCUMENTS

EP      940336 A2 *  9/1999

(Continued)

OTHER PUBLICATIONS

Chang, M. et al.; "Preliminary (Issue #1) Power-by-Wire Development and Demonstration—Electrical Power Center Module Requirements and Specifications;" McDonnell Douglas Aerospace Transport Aircraft; Nov. 1994; 126 pgs.

(Continued)

*Primary Examiner*—Joseph Waks
(74) *Attorney, Agent, or Firm*—Hope Baldauff Hartman, LLC

(57) ABSTRACT

An electrical architecture for an aircraft is provided. The electrical architecture is particularly suitable for relatively small, compact, and lightweight aircraft. In one embodiment, the electrical architecture includes an electrical generator component coupled to the aircraft engine, and an air compression system coupled to the electrical generator component. The electrical generator component is configured to receive mechanical power from the engine and to generate a constant frequency AC electrical power from the engine mechanical power, and the air compression system is configured to receive the constant frequency AC power as an input and, in response thereto, produce a pressurized air output having variable characteristics (for example, a variable flow rate or a variable air pressure).

13 Claims, 4 Drawing Sheets

U.S. PATENT DOCUMENTS

| | | | |
|---|---|---|---|
| 4,419,926 A | | 12/1983 | Cronin et al. |
| 4,426,911 A | | 1/1984 | Robinson |
| 4,434,624 A | | 3/1984 | Cronin et al. |
| 4,462,561 A | | 7/1984 | Cronin |
| 4,494,372 A | | 1/1985 | Cronin |
| 4,503,666 A | | 3/1985 | Christoff |
| 4,510,433 A | * | 4/1985 | Gamze et al. ................. 322/32 |
| 4,514,976 A | | 5/1985 | Christoff |
| 4,523,517 A | | 6/1985 | Cronin |
| 4,533,097 A | | 8/1985 | Aldrich |
| 4,546,939 A | | 10/1985 | Cronin |
| 4,684,081 A | | 8/1987 | Cronin |
| 4,694,654 A | | 9/1987 | Kawamura et al. |
| 4,706,908 A | | 11/1987 | Huffman et al. |
| 4,759,515 A | | 7/1988 | Udo |
| 4,762,294 A | | 8/1988 | Udob |
| 4,910,414 A | | 3/1990 | Krebs |
| 5,074,495 A | | 12/1991 | Raymond |
| 5,145,124 A | | 9/1992 | Brunskill et al. |
| 5,299,763 A | | 4/1994 | Bescoby et al. |
| 5,309,029 A | | 5/1994 | Gregory et al. |
| 5,323,603 A | | 6/1994 | Malohn |
| 5,418,446 A | * | 5/1995 | Hallidy ........................ 322/28 |
| 5,490,645 A | | 2/1996 | Woodhouse |
| 5,535,601 A | | 7/1996 | Teraoka et al. |
| 5,709,103 A | | 1/1998 | Williams |
| 5,813,630 A | | 9/1998 | Williams |
| 5,899,085 A | | 5/1999 | Williams |
| 5,939,800 A | * | 8/1999 | Artinian et al. ............... 307/64 |
| 5,967,461 A | | 10/1999 | Farrington |
| 6,241,182 B1 | | 6/2001 | Durandeau |
| 6,526,775 B1 | | 3/2003 | Asfia |
| 6,681,592 B1 | | 1/2004 | Lents et al. |
| 6,704,625 B2 | | 3/2004 | Albero et al. |
| 6,755,375 B2 | | 6/2004 | Trikha |
| 6,928,832 B2 | | 8/2005 | Lents et al. |
| 7,064,455 B2 | * | 6/2006 | Lando ........................ 290/1 C |
| 7,207,521 B2 | | 4/2007 | Atkey et al. |
| 7,227,338 B2 | * | 6/2007 | Lando ........................ 322/14 |
| 2002/0113167 A1 | | 8/2002 | Albero |

OTHER PUBLICATIONS

Chang, M. et al., "Preliminary (Issue #3) Power-by-Wire Development and Demonstration—Power Management and Distribution Requirements and Specifications," McDonnell Douglas Aerospace Transport Aircraft; Jun. 1995; 138 pgs.

"Meeting Minutes from the NASA PBW Critical Design Review (CDR);" McDonnell Douglas Aerospace Transport Aircraft; Jul. 9, 1996; 524 pgs.

Williams, Kenneth R., "Integrated Power Systems for Future Transport Aircraft," Transport Aircraft Division; McDonnell Douglas Aerospace Transport Aircraft; Jan. 3, 1997; 8 pgs.

"Power-by-Wire Program;" McDonnell Douglas Aerospace Transport Aircraft, Oct. 19, 1993; NASA Lewis Planning Meeting: Cleveland, OH; 64 pgs.

Groom, Nelson J. et al., "Electric Flight Systems," NASA Conference Publication 2209, Hampton, Virginia, Jun. 9-10, 1981, 279 pgs.

"Aircraft Electric Secondary Power," Proceedings of a Conference held at NASA Lewis Research Center, Cleveland, Ohio, Sep. 14-17, 1982, NASA Conference Publication 2282, 17 pgs., pp. 37-50.

IEEE 1983 National Aerospace and Electronics Conference, NAECON 1983, pp. i-ii, pp. 74-79.

Tagge, G.E., et al., "Systems Study for an Integrated Digital/Electric Aircraft (IDEA)," NASA, 1985,228 pgs.

Murray, W. E. et al., "Evlauation of All-Electric Secondary Power for Transport Aircraft," NASA Contractor Report 189077, Jan. 1992, 314 pgs.

Weimer, Joseph A., "21st Century Plane, Powering the United States Air Force," Presented at Indiana Energy Technology Sizzle, Purdue University, accessed prior to Dec. 20, 2000, 14 pgs.

"All-Electric Aircraft, vol. I and vol. 11," presented at IEEE/AESS Symposium, Dayton, Ohio, Nov. 30, 1983, 91 pgs.

* cited by examiner

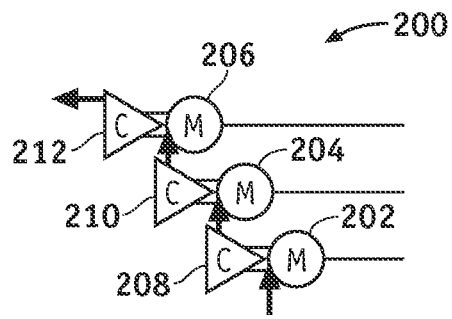
FIG. 2
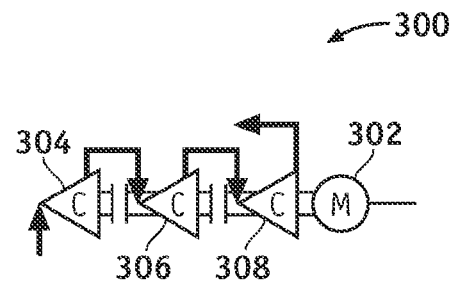
FIG. 3
FIG. 4
FIG. 5
FIG. 6
FIG. 7

ELECTRICAL SYSTEMS ARCHITECTURE FOR AN AIRCRAFT, AND RELATED OPERATING METHODS

TECHNICAL FIELD

Embodiments of the subject matter described herein relate generally to electrical power systems for aircraft. More particularly, embodiments of the subject matter relate to an electrical power system for an environmental control system of an aircraft.

BACKGROUND

Conventional transport aircraft typically utilize pneumatic, hydraulic, and electric power from main engines to support various aircraft systems during flight. In addition, conventional transport aircraft typically utilize pneumatic and electric power from onboard auxiliary power units (APUs) to support aircraft systems during ground operations. Aircraft air conditioning systems (also known as environmental control systems, or ECSs) are typically the largest secondary power users on commercial transport aircraft. Some conventional ECSs use high temperature/high pressure air extracted from the engine compressor stages (bleed air). In such a pneumatic bleed architecture, hot pressurized air is extracted from the compressor section of the engine, cooled, and then routed through ducting to pneumatically power utilization equipment such as the ECS. The APU typically drives an air compressor to provide a source of air for the utilization equipment at certain times during flight and on the ground before the main engines are started. During a typical engine start, pressurized air provided by the APU compressor (or the other engine if it is running) is routed through a duct to an air turbine starter on each engine. During engine start, the supply of air to other utilization equipment is temporarily suspended until the engine is successfully started, to allow the entire air flow from the source to be utilized to start the engine. When pneumatic bleed air is extracted from an engine, this work (performed by the engine) does not help to produce thrust, so engine fuel economy is adversely affected. However, during some phases of engine operation it is necessary to reduce pressure inside the engine by extracting bleed air to maintain proper operability margin.

A traditional pneumatic architecture would not be cost effective in a smaller, lightweight aircraft that must satisfy new FAA requirements for passenger fresh air flow (which will result in greater ECS power consumption and reduction in airplane fuel consumption compared with current production aircraft). There have been few advances in pneumatic technology to serve as enablers for a substantially improved pneumatic aircraft architecture.

Modern aircraft are beginning to employ an all-electric architecture. An all-electric architecture eliminates pneumatic (bleed) air extraction from the engines and APU. An all-electric architecture uses large electrical generators driven by the engines, and large generators on the APU, to produce electrical power sufficient to drive major system utilization equipment. These generators produce variable frequency AC electrical power, in which the frequency of the power tracks the speed of the engine rotor to which the generator is connected. A majority of the AC power is immediately rectified to produce DC power which is supplied to large motor controllers that operate the motors in the ECS equipment, hydraulic motor pumps, and other equipment. These large motor controllers offer continuously variable motor control, good motor torque characteristics, high efficiency, soft start, and low inrush current. However, they are large, heavy, and require a special liquid cooling system to address the high densities of heat that are generated during power conversion. The all-electric architecture can generally be characterized as being efficient for long flights, but very complex. Consequently, such an all-electric architecture may not be the best approach for a smaller aircraft with a lower target cost and shorter mission range.

A traditional all-electric architecture ceases to be cost effective or meet cost and weight targets when it is scaled down to meet the needs of a much smaller aircraft. In particular, the large motor controllers and power conversion equipment required to operate major systems on the aircraft from power sources that produce variable frequency AC power are bulky, heavy, costly, and require a special liquid cooling system. In addition, many smaller motor loads located throughout the aircraft require motor controllers to be compatible with variable frequency AC power, resulting in added complexity, cost and weight. Although the efficiency gained for long flights is better for the all-electric architecture than for a traditional pneumatic system, the all-electric architecture has not been demonstrated to be the most cost effective approach for a much smaller aircraft with shorter range.

BRIEF SUMMARY

An electrical architecture for an aircraft, and related operating methods, are provided. The electrical architecture can be used to drive an ECS of a relatively small and lightweight aircraft.

The above and other aspects may be carried out by an embodiment of an electrical architecture for an aircraft having an engine. The electrical architecture includes an electrical generator component coupled to the engine, the electrical generator component being driven by the engine to produce constant frequency AC power, and an air compression system coupled to the electrical generator component, the air compression system being configured to receive the constant frequency AC power as an input and, in response thereto, produce a pressurized air output having variable characteristics.

The above and other aspects may be carried out by an embodiment of a method of operating an electrical architecture for an aircraft having an engine. The method involves: generating constant frequency AC power from engine power obtained from the engine; providing the constant frequency AC power to an air compression system; and in response to the constant frequency AC power, producing a pressurized air output having variable characteristics.

The above and other aspects may be carried out by an embodiment of a method of electrically operating an environmental control system of an aircraft having an engine. The method involves: generating a constant frequency AC power from engine power; powering an air compression system with the constant frequency AC power; and in response to the constant frequency AC power, the air compression system producing pressurized air having variable output characteristics.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a schematic representation of an embodiment of a multi-step compressor architecture suitable for use in an air compression system;

FIG. 3 is a schematic representation of an embodiment of a staged compressor architecture suitable for use in an air compression system;

FIG. 4 is a schematic representation of an embodiment of a variable geometry compressor architecture suitable for use in an air compression system;

FIG. 5 is a schematic representation of an embodiment of an open differential compressor architecture suitable for use in an air compression system;

FIG. 6 is a schematic representation of an embodiment of a multiple motor compressor architecture suitable for use in an air compression system;

FIG. 7 is a schematic representation of an embodiment of a multi-speed motor architecture suitable for use in an air compression system;

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
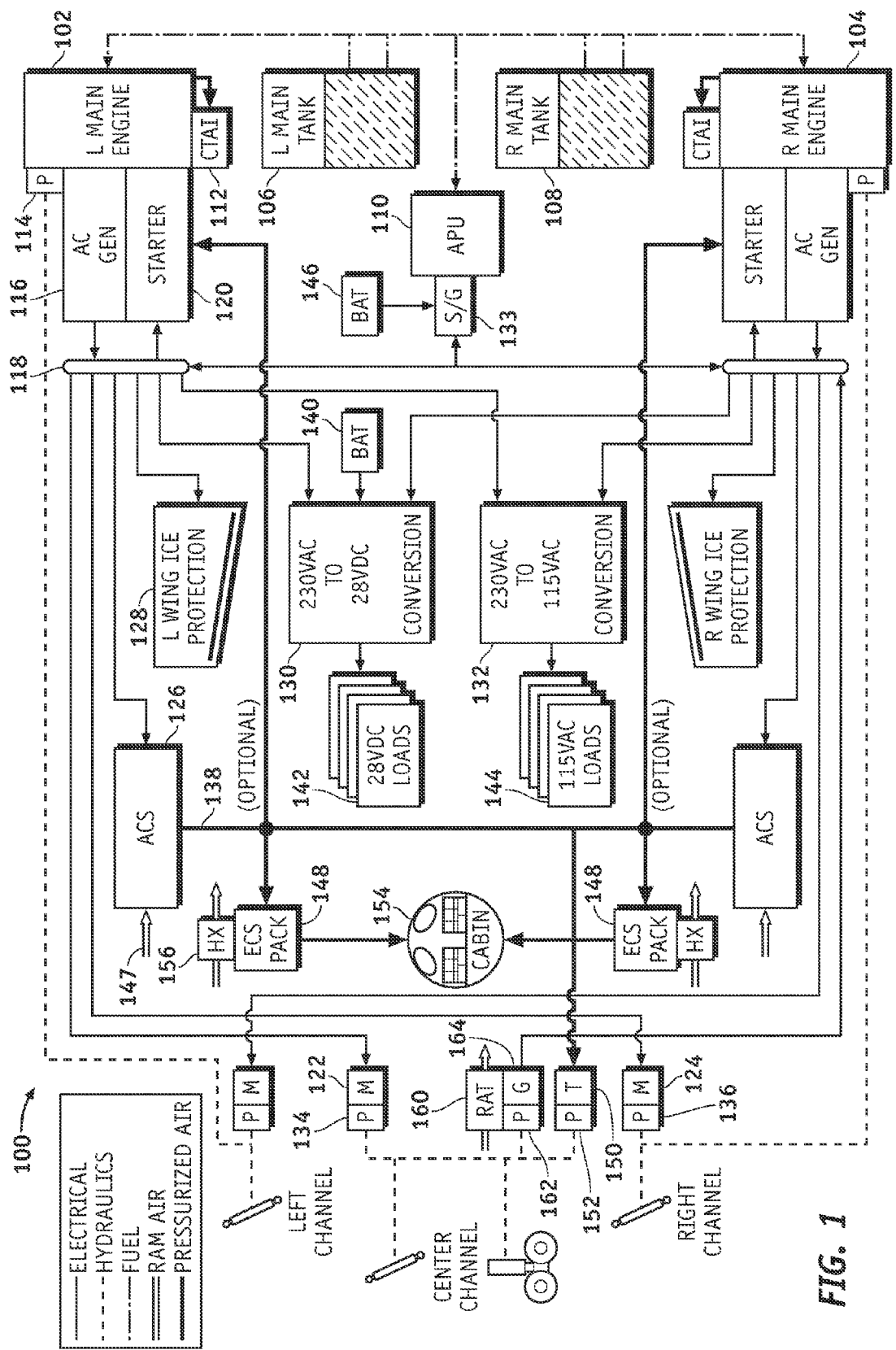
FIG. 1 is a schematic representation of an embodiment of an electrical architecture for an aircraft.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the depicted subject matter.

For the sake of brevity, conventional techniques related to electrical power architectures, aircraft operation, air conditioning and environmental control systems, compressor motor control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

The system embodiment described herein is particularly suitable for use in a small, lightweight aircraft having a no-bleed all-electric architecture. In such compact aircraft there is little room for systems equipment. The electric architecture described herein provides a simpler, less expensive system that includes the operating benefits of an all-electric architecture without the usual weight and size penalties. Certain features, functions, and elements of the embodiment described here are similar to that described in U.S. Pat. No. 7,207,521, the relevant content of which is incorporated by reference herein.

The embodiment described herein represents a simple hybrid electric/pneumatic aircraft architecture which provides full aircraft system functionality (engine start, air conditioning, flight controls, hydraulics, ground power) more efficiently than a pneumatic architecture with lower weight, volume, and cost than a traditional all-electric architecture. Its capabilities include, but are not limited to, sixty second engine start and cabin air flow, which is compliant with current federal aviation regulations. Certain embodiments eliminate ancillary equipment typical of an all-electric architecture, such as autotransformer rectifier units, large motor controllers, and power electronic cooling systems. This equipment elimination results in increased volume for airline revenue generation. In one embodiment the electrical architecture is no-bleed so it does not rely on unregulated bleed air extraction from the engine (as in traditional pneumatic architectures). Moreover, the electrical power generated from the engines is constant frequency AC, which reduces the complexity, cost, and weight of many aircraft loads. Thus, the embodiment described herein combines the simplicity of a pneumatic architecture with the advantages of an all-electric architecture, resulting in reduced weight, cost, and complexity for the aircraft.

FIG. 1 is a schematic representation of an embodiment of an electrical architecture 100 for an aircraft. The legend in FIG. 1 indicates the type of connection, coupling, ducting, or routing among the various components: a thin solid line represents an electrical coupling; a dashed line represents a hydraulic line; a dotted-and-dashed line represents a fuel line; a double line represents ram air flow; and a thick solid line represents pressurized air flow. Electrical architecture 100 is depicted in a simplified manner, and an embodiment of electrical architecture 100 might include additional components, control or processing elements, or the like. For this particular embodiment, the aircraft includes at least two main engines: a left main engine 102 and a right main engine 104. Engines 102/104 provide propulsive thrust to the aircraft during flight and ground operations; for this embodiment, each engine 102/104 is a jet engine. Engines 102/104 receive fuel from a left main fuel tank 106 and a right main fuel tank 108. One or both fuel tanks 106/108 also provides fuel to an APU 110.

For the most part, electrical architecture 100 includes equivalent structure associated with left main engine 102 and right main engine 104. For the sake of brevity and ease of description, the components and functionality of the structure corresponding to left main engine 102 will be described in detail here. The description also applies in an equivalent manner to the components and functionality of the structure corresponding to right main engine 104.

Pressurized bleed air generated by left main engine 102 may be routed to a cowl thermal anti-icing system (CTAI) 112 for the aircraft. CTAI 112 is suitably configured to prevent ice buildup on the nose cowl of left main engine 102. Engine 102 is also utilized to drive at least one hydraulic pump 114 that services the hydraulic system (or a portion thereof) of the aircraft, such as the left hydraulic channel of the aircraft. The illustrated embodiment of electrical architecture 100 includes an electrical generator component 116 coupled to engine 102. Electrical generator component 116 is suitably configured to receive mechanical power from engine 102 while engine 102 is operational. Electrical generator component 116 then generates a constant frequency AC power from this mechanical power. In certain embodiments, electrical generator component 116 receives shaft power from engine 102, and the shaft power is used to generate the constant frequency AC power. Notably, electrical generator component 116 need not rely on any bleed air from engine 102.

The AC power produced by the electrical generator component 116 has a constant frequency that remains substantially stable regardless of the operating speed of engine 102. Depending upon the specific implementation, the limits for the frequency of the AC power will typically be in the range from 380 to 420 Hz during normal operation. The voltage of the constant frequency AC power is selected to suit the needs of the particular implementation. For example, one practical embodiment may require 230 VAC rms phase to neutral constant frequency power, while another practical embodiment may require 115 VAC constant frequency power.

Electrical generator component 116 is realized in a compact and lightweight manner, relative to existing all-electric equipment that employ heavy and bulky motor controllers, motor drives, power electronics. In this regard, electrical generator component 116 is preferably deployed with minimal to no power electronics components. This lack of power electronics allows electrical architecture 100 to be deployed in small aircraft having low onboard weight requirements.

Electrical architecture 100 also includes a starter component 120 for engine 102. In practice, starter component 120 may be integrated with electrical generator component 116 (as a combined starter-generator component), or it may be realized as a separate component that is distinct from electrical generator component 116. Starter component 120 provides shaft power for starting engine 102. Starter component 120 is suitably configured to receive electric operating power from any number of electrical sources on the aircraft, such as bus 118. Alternatively (or additionally), starter component 120 may receive pneumatic operating power from a pressurized air source such as, for example, an air compression system as described in more detail below.

As schematically illustrated in FIG. 1, the constant frequency AC power is provided to a bus 118, a node, or other suitable electrical distribution element or architecture. Bus 118 facilitates the distribution of the constant frequency AC power to other aircraft subsystems, components, and devices as needed. As depicted in FIG. 1, the constant frequency AC power present at bus 118 is used by the following: an electrical motor 122; an electrical motor 124; an air compression system (ACS) 126; a left wing ice protection subsystem 128; an AC-to-DC power conversion element 130; an AC-to-AC power conversion element 132; a starter-generator component 133 for APU 110; and (optionally) starter component 120.

Electrical motor 122 drives a hydraulic pump 134 that services the hydraulic system (or a portion thereof) of the aircraft, such as the center hydraulic channel of the aircraft. Similarly, electrical motor 124 drives a hydraulic pump 136 that services the hydraulic system (or a portion thereof) of the aircraft, such as the right hydraulic channel of the aircraft.

ACS 126, which is coupled to electrical generator component 116 via bus 118, is suitably configured to receive the constant frequency AC power as an input and, in response thereto, produce a pressurized air output 138 having variable characteristics. ACS 126 is described in more detail below.

Left wing ice protection subsystem 128 utilizes electrical power from the constant frequency AC bus. Left wing ice protection subsystem 128 can be configured in accordance with at least two embodiments to prevent or at least reduce the formation of ice on a portion of the wing. In an electrothermal ice protection embodiment, heating elements such as blankets (not shown) can be bonded or otherwise positioned proximate to interior or exterior portions of the wing leading edges. For wing ice protection, the heating blankets can be energized sequentially to heat the wing leading edge causing any ice build-up to melt and/or detach from the wing leading edge. This technique tends to level out or minimize peak power demand because desired portions of the wing leading edge are heated sequentially rather than simultaneously. Consequently, the peak power draw for ice protection is significantly reduced. In addition, in contrast to bleed air systems, there are no bleed air exhaust holes on the wing. As a result, aircraft drag and community noise are reduced relative to conventional systems.

Left wing ice protection subsystem 128 can also operate as an electromechanical system in accordance with another embodiment. In this embodiment, electromechanical actuators (not shown) in an interior portion of the wing leading edges can be configured to briefly vibrate the wing leading edge, causing any ice build-up to detach and fall away. This embodiment may require significantly less electrical power than the electrothermal embodiment discussed above. In either embodiment, left wing ice protection subsystem 128 can be divided into different segments that apply to different regions of the wing or slat leading edge. Thus, if one portion of the wing leading edge does not require ice protection, then the respective section of left wing ice protection subsystem 128 can be turned off, resulting in a further reduction in power demand from the engines. Additionally, different sections of the ice protection system can be cycled according to different schedules as required to sufficiently reduce ice while optimizing power usage.

AC-to-DC power conversion element 130 is configured to convert input AC power into DC power. For the illustrated embodiment, AC-to-DC power conversion element 130 receives the constant frequency AC power from bus 118 as an input and produces a 28 VDC output. As depicted in FIG. 1, AC-to-DC power conversion element 130 may also receive constant frequency AC power generated by the electrical generator component associated with right main engine 104. Operating power for AC-to-DC power conversion element 130 may be provided by an appropriate power source such as, for example, the engine-driven or APU-driven AC generators. Additionally, 28 VDC power from a battery 140 can be provided to 28 VDC loads 142 via element 130, without undergoing power conversion. This particular embodiment of electrical architecture 100 generates constant frequency 230 VAC power, and AC-to-DC power conversion element 130 converts this 230 VAC power into 28 VDC. In turn, the 28 VDC is used to power one or more 28 VDC loads 142 on the aircraft.

AC-to-AC power conversion element 132 is configured to convert input AC power into AC power having different characteristics. For the illustrated embodiment, AC-to-AC power conversion element 132 receives the constant frequency AC power from bus 118 as an input. As depicted in FIG. 1, AC-to-AC power conversion element 132 may also receive constant frequency AC power generated by the electrical generator component associated with right main engine 104. This particular embodiment of electrical architecture 100 generates constant frequency 230 VAC power, and AC-to-AC power conversion element 132 converts this 230 VAC power into 115 VAC. In turn, the 115 VAC is used to power one or more 115 VAC loads 144 on the aircraft. This AC-to-AC power conversion element 132 also operates bi-directionally, interfacing with existing ground service equipment and converting 115 VAC ground power to 230 VAC.

APU 110 provides power to aircraft systems when needed during ground operations and in flight. Starter-generator component 133 functions to start APU 110 when needed and, after APU 110 is operational, component 133 generates electrical power for the aircraft. In alternate embodiments, power for starting APU 110 can be provided by an aircraft battery 146, an external ground power source (not shown), or a starter component similar in function but with a smaller power rating as component 120. In contrast to traditional and older APUs, APU 110 provides only electric power to the various aircraft systems. Consequently, it can be much simpler than traditional APUs because all of the components associated with pneumatic power delivery can be eliminated. Therefore in summary, component 133 can be started from: either the battery 146, or receive power from bus 118, or from an external power source, and when operating as a generator it provides AC power to the bus 118 of the same frequency and voltage as AC generator 116.

ACS 126 receives fresh outside air via a ram air inlet 147. The fresh air is compressed and ACS 126 generates pressurized air output 138. As mentioned above, ACS 126 uses the constant frequency AC power as its power source. ACS 126 is preferably realized in a compact and lightweight manner, relative to existing all-electric equipment that employ heavy and bulky motor controllers, motor drives, or power electronics. In this regard, ACS 126 is preferably deployed with minimal to no power electronics components. Indeed, preferred embodiments of ACS 126 lack any motor controllers, power electronics components, motor drives, power conversion elements, and the like. This lack of power electronics allows ACS 126 to be deployed in small aircraft having low onboard weight requirements.

Although not separately depicted in FIG. 1, the operation of ACS 126 is controlled and regulated by at least one control signal that influences the operation of one or more compressor motors employed by ACS 126. These compressor motors are controlled to vary the characteristics of pressurized air output 138. For example, ACS 126 may be configured to produce pressurized air output 138 having a variable air flow rate, a variable air pressure, or the like. The desired characteristics of pressurized air output 138 are influenced by factors such as, without limitation: outside air temperature; outside air pressure; desired compressed air flow rate; desired engine air driven starter pressure and flow rate; desired hydraulic air driven pump pressure and flow rate; and the desired cabin pressure. For example, if a lower cabin altitude is desired (higher cabin pressure), then ACS 126 can accommodate this by increasing pressure of air output 138.

One benefit of the electric approach to air conditioning over the conventional pneumatic approach is that the power extracted from the engines for the electric approach is not wasted by pre-coolers and modulating valves in the pneumatic system. Instead, the air compression systems only draw enough electric power from the engines 102/104 as is required to meet the immediate pressurization and ventilation needs of the cabin. This real-time power optimization can be extended to other electric power loads across the aircraft platform to improve fuel efficiency. These loads include, without limitation, recirculation fans, lavatory and galley vent fans, cargo heaters, wing ice protection heaters, and hydraulic actuators. By only drawing the power needed, fuel economy can be increased.

FIGS. 2-7 illustrate different configurations of fixed speed motors that are suitable for use with the system described herein. FIG. 2 is a schematic representation of an embodiment of a multi-step compressor architecture 200 suitable for use in an ACS such as ACS 126. This embodiment includes three separate compressor motors 202/204/206, each being configured to drive a respective compressor 208/210/212. Although FIG. 2 depicts three motors and three compressors, an embodiment of multi-step compressor architecture 200 need not be limited to any particular number of motors or compressors. Each compressor motor 202/204/206 is powered by a constant frequency AC power, such as that provided by bus 118 in FIG. 1. The input to compressor 208 represents the overall input to multi-step compressor architecture 200, and the output of compressor 212 represents the overall output of multi-step compressor architecture 200. In operation, the number of motor driven compressors operating is controlled based on the desired output needed. For example, only one motorized compressor is running for a ground condition while all three motorized compressors are on for a cruise condition.

FIG. 3 is a schematic representation of an embodiment of a staged compressor architecture 300 suitable for use in an ACS such as ACS 126. This embodiment includes one compressor motor 302 that is configured to drive a plurality of staged compressors 304/306/308. Although FIG. 3 depicts one motor and three compressors, an embodiment of staged compressor architecture 300 need not be limited to any particular number of motors or compressors. Here, compressor motor 302 is powered by a constant frequency AC power, such as that provided by bus 118 in FIG. 1. The input to compressor 304 represents the overall input to staged compressor architecture 300, and the output of compressor 308 represents the overall output of staged compressor architecture 300. In operation, the number of compressors operating is controlled based on the desired output needed. For example, the electric motor drives one compressor for a ground condition while the same electric motor drives all three compressors for a cruise condition.

FIG. 4 is a schematic representation of an embodiment of a variable geometry compressor architecture 400 suitable for use in an ACS such as ACS 126. This embodiment includes one compressor motor 402 that is configured to drive one or more variable geometry compressors 404. Although FIG. 4 depicts one motor and one compressor, an embodiment of variable geometry compressor architecture 400 need not be limited to any particular number of motors or compressors. Here, compressor motor 402 is powered by a constant frequency AC power, such as that provided by bus 118 in FIG. 1. The input to compressor 404 represents the overall input to variable geometry compressor architecture 400, and the output of compressor 404 represents the overall output of variable geometry compressor architecture 400. In operation, the angular position of the compressor rotor vanes is adjusted to provide the desired air output needed.

FIG. 5 is a schematic representation of an embodiment of an open differential compressor architecture 500 suitable for use in an ACS such as ACS 126. This embodiment includes a compressor motor 502, a speed-trim motor 504, a mechanical differential gearbox 508, and a compressor 506. Although FIG. 5 depicts one motor, one speed-trim motor, one differential gearbox, and one compressor, an embodiment of open differential compressor architecture 500 need not be limited to any particular number of motors, speed-trim motors, differential gearboxes, or compressors. Here, compressor motor 502 and speed-trim motor 504 are both powered by a constant frequency AC power, such as that provided by bus 118 in FIG. 1. Compressor motor 502 and speed-trim motor 504 cooperate to drive compressor 506 at variable speed via differential gearbox 508. The input to compressor 506 represents the overall input to open differential compressor architecture 500, and the output of compressor 506 represents the overall output of open differential compressor architecture 500. In operation, the speeds of the motors are combined and controlled based on the desired compressor output speed needed. For example, the main motor drives the compressor for a ground condition while both the main and trim motors drive the compressor for a cruise condition. The speed of the output compressor 506 is proportional to the combined speeds of motor 502 and speed-trim motor 504.

FIG. 6 is a schematic representation of an embodiment of a multiple motor compressor architecture 600 suitable for use in an ACS such as ACS 126. This embodiment includes three compressor motors 602/604/606 that are configured to drive a single compressor 608. Although FIG. 6 depicts three motors and one compressor, an embodiment of multiple motor compressor architecture 600 need not be limited to any particular number of motors or compressors. Each compressor motor 602/604/606 is powered by a constant frequency AC power, such as that provided by bus 118 in FIG. 1. The input to compressor 608 represents the overall input to multiple motor compressor architecture 600, and the output of compressor 608 represents the overall output of multiple motor compressor architecture 600. In operation, the number of mechanically connected motors operating is controlled based on the desired output needed. For example, one motor is used to drive the compressor for a ground condition while all three motors are used to drive the compressor for a cruise condition.

FIG. 7 is a schematic representation of an embodiment of a multi-speed motor architecture 700 suitable for use in an ACS such as ACS 126. This embodiment includes one multi-speed speed compressor motor 702 that is configured to drive one or more compressors 704. Although FIG. 7 depicts one motor and one compressor, an embodiment of multi-speed compressor architecture 700 need not be limited to any particular number of motors or compressors. Here, multi-speed compressor motor 702 includes three switched inputs, each of which is powered by a constant frequency AC power, such as that provided by bus 118 in FIG. 1. The state of the switch controls the speed of multi-speed compressor motor 702. The input to compressor 704 represents the overall input to multi-speed compressor architecture 700, and the output of compressor 704 represents the overall output of multi-speed compressor architecture 700. In operation, the switch setting of the motor is electrically controlled based on the desired output needed. For example, the motor at low speed setting is used to drive the compressor for a ground condition while the motor at high speed setting is used to drive the compressor for a cruise condition.

The variations depicted in FIGS. 2-7 represent several possible implementations of ACS 126. An embodiment of ACS 126, however, may utilize an alternative architecture, a combination of one or more of the architectures depicted in FIGS. 2-7, or a modified version of one of the architectures depicted in FIGS. 2-7.

Referring again to FIG. 1, pressurized air output 138 is provided to ECS packs 148 and to at least one air turbine 150. Optionally, pressurized air output 138 may be provided to starter component 120 and/or to the starter component for right main engine 104. Air turbine 150 drives a hydraulic pump 152 that services the hydraulic system (or a portion thereof) of the aircraft, such as the center hydraulic channel of the aircraft. Pressurized air output 138 may be used to provide a pneumatic source of engine start power, in lieu of or in addition to electrical power.

ECS packs 148 (also referred to as air conditioning units) are configured to provide conditioned air to the aircraft interior 154 in the aircraft to meet temperature, pressure, and ventilation needs. Although ECS packs 148 and the ACSs are depicted as separate components in FIG. 1, an alternate embodiment may employ at least one integrated component that combines an ECS pack with an ACS. An embodiment of an ECS pack 148 may include or cooperate with a heat exchanger 156, a condenser, a reheater, an expansion element, ducting, sensors, modulating valves, and/or fans that cooperate to form a refrigeration cycle for air in aircraft interior 154. In practice, ACS 126 is controlled to generate pressurized air output 138 at different pressures and flow rates to distribute the air to various parts of aircraft interior 154 to meet the particular demands of the aircraft interior 154 at any given time.

The embodiment of electrical architecture 100 depicted in FIG. 1 also includes a ram air turbine 160, a hydraulic pump 162 coupled to ram air turbine 160, and a generator 164 coupled to ram air turbine 160. Ram air turbine 160 is configured to generate power (if necessary) from the airstream while the aircraft is in flight. Thus, ram air turbine 160 can be utilized to drive hydraulic pump 162, which services the hydraulic system (or a portion thereof) of the aircraft, such as the center hydraulic channel of the aircraft. In addition, ram air turbine 160 can be utilized to drive generator 164, which is configured to generate electrical power for the aircraft. In this embodiment, generator 164 is suitably configured to generate a constant frequency AC power, such as the 230 VAC supply power described above.

Figure 8:
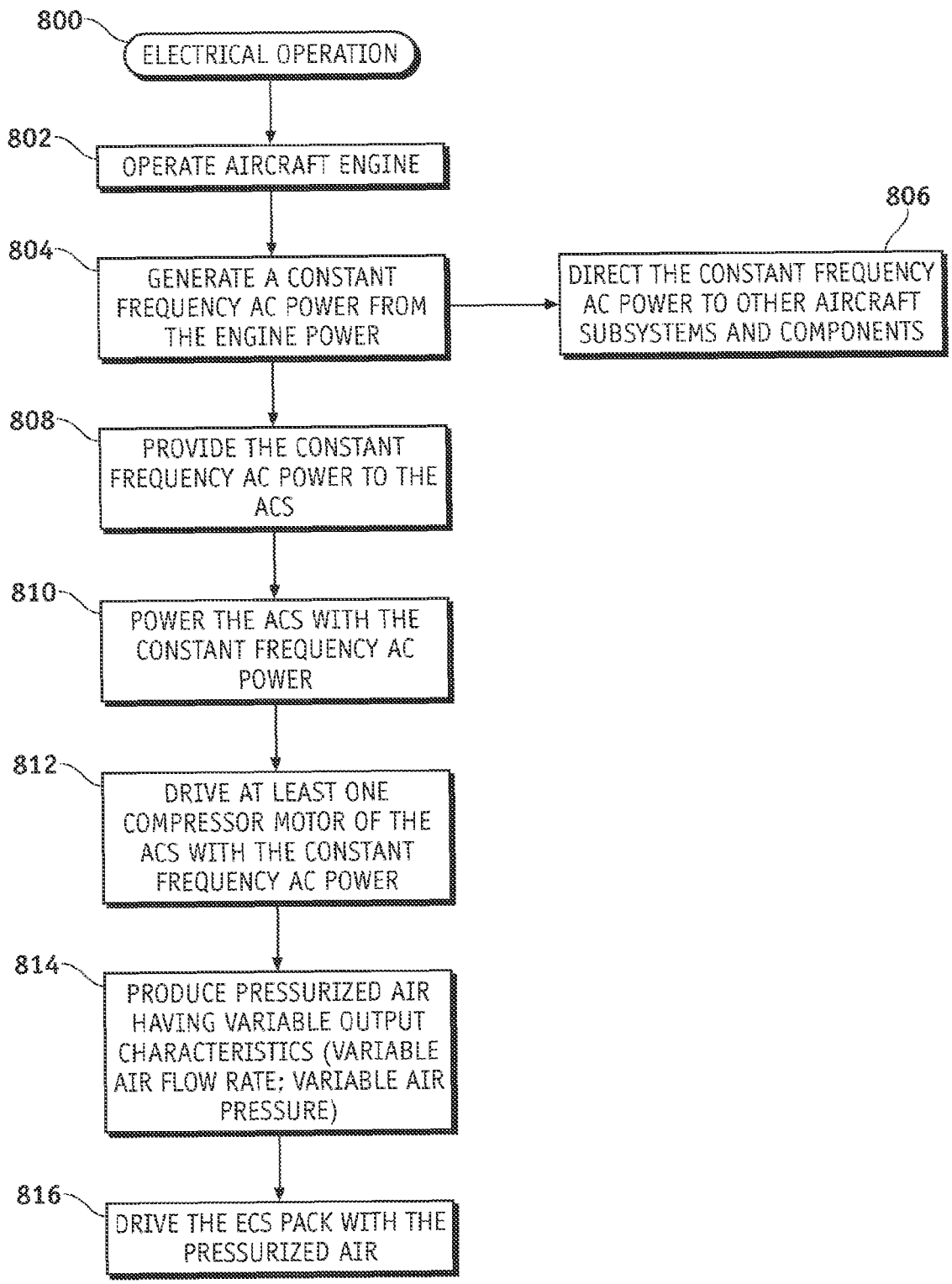
FIG. 8 is a flow chart that illustrates an embodiment of an electrical operation process.

FIG. 8 is a flow chart that illustrates an embodiment of an electrical operation process 800. The various tasks performed in connection with process 800 may be performed by software, hardware, firmware, or any combination thereof. For illustrative purposes, the following description of process 800 may refer to elements mentioned above in connection with FIGS. 1-7. In practice, portions of process 800 may be performed by different elements of the described system, e.g., the constant frequency AC power generator, the ACS, or the like. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

Electrical operation process 800 is performed during operation of an aircraft engine (task 802). Operation of the engine (or engines) generates engine power that is primarily used for propulsion of the aircraft. In addition, process 800 generates a constant frequency AC power from the engine power obtained from the engine (task 804). This constant frequency AC power can be directed or provided to one or more aircraft subsystems, components, devices, and/or loads as needed (task 806). In particular, process 800 provides the constant frequency AC power to an ACS of the aircraft (task 808).

The constant frequency AC power is used to power the ACS (task 810). Specifically, the ACS receives the constant frequency AC power and, in response to that AC power, drives at least one compressor motor associated with the ACS (task 812). The ACS is controlled in an appropriate manner to produce a pressurized air output having variable output characteristics (task 814). As described above, the pressurized air may have a variable flow rate, a variable air pressure, or the like. The pressurized air output is then used to drive one or more ECS packs of the aircraft (task 816). The ECS packs utilize the compressed air to carry out a refrigeration cycle to cool and/or dehumidify the passenger cabin air.

Figure 9:
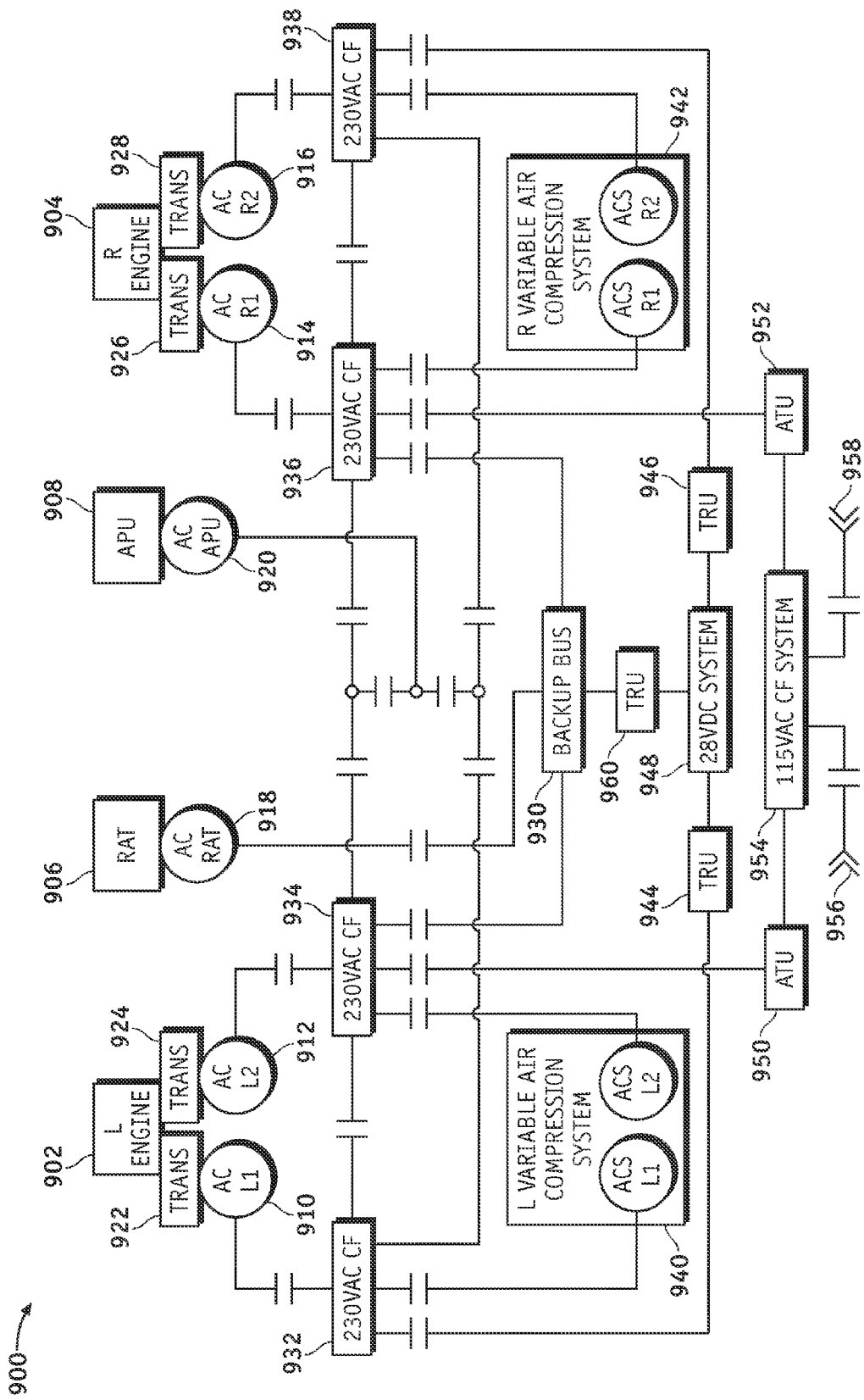
FIG. 9 is a schematic circuit diagram of an embodiment of an electric power distribution system for an aircraft.

FIG. 9 is a schematic circuit diagram of an embodiment of an electric power distribution system 900 for an aircraft. An embodiment of electrical architecture 100 may utilize electric power distribution system 900. Some of the components, features, and functions of system 900 are similar to those described above for electrical architecture 100, and common aspects will not be redundantly described here in the context of system 900. The illustrated embodiment includes a first (left) engine 902, a second (right) engine 904, a ram air turbine (RAT) 906, and an APU 908. System 900 also includes a plurality of AC generators: a first constant frequency AC generator 910 coupled to left engine 902; a second constant frequency AC generator 912 coupled to left engine 902; a third constant frequency AC generator 914 coupled to right engine 904; a fourth constant frequency AC generator 916 coupled to right engine 904; an AC generator 918 coupled to RAT 906; and an AC generator 920 coupled to APU 908.

First constant frequency AC generator 910 and second constant frequency AC generator 912 are operably coupled to left engine 902 via respective transmission elements 922/924. Similarly, third constant frequency AC generator 914 and fourth constant frequency AC generator 916 are operably coupled to right engine 904 via respective transmission elements 926/928. In another embodiment, transmission elements 922/924/926/928 may not be needed if left engine 902 and right engine 904 create a constant speed output shaft to which the constant frequency AC generators 910/912/914/916 are coupled. First constant frequency AC generator 910 provides a constant frequency AC power to an AC bus 932 of the aircraft, second constant frequency AC generator 912 provides a constant frequency AC power to an AC bus 934 of the aircraft, third constant frequency AC generator 914 provides a constant frequency AC power to an AC bus 936 of the aircraft, and fourth constant frequency AC generator 916 provides a constant frequency AC power to an AC bus 938 of the aircraft. FIG. 9 depicts an embodiment where these AC buses 932/934/936/938 are associated with a constant frequency 230 VAC power. Moreover, some or all of these AC buses 932/934/936/938 may be coupled together in an embodiment of system 900.

System 900 includes a first (left) variable air compression system 940 and a second (right) variable air compression system 942. Each variable air compression system 940/942 is powered by the generated constant frequency AC power, as described in more detail above with reference to electrical architecture 100.

As shown in FIG. 9, AC bus 932 is coupled to a transformer rectifier unit (TRU) 944, and AC bus 938 is coupled to a TRU 946. TRUs 944/946 are configured to convert the constant frequency AC power into an appropriate DC power, for example, 28 VDC. In this regard, TRUs 944/946 can be used to power any number of loads, subsystems, and/or devices in a 28 VDC system 948.

For this embodiment, AC bus 934 is coupled to an autotransformer unit (ATU) 950, and AC bus 936 is coupled to an ATU 952. ATUs 950/952 are configured to convert the constant frequency AC power into a different constant frequency AC power. For example, the illustrated embodiments of ATUs 950/952 convert the constant frequency 230 VAC power into a constant frequency 115 VAC power. Thus, ATUs 950/952 can be used to power any number of loads, subsystems, and/or devices in a 115 VAC system 954. System 900 also includes a first electrical receptacle 956 and a second electrical receptacle 958 configured to receive power from external ground power sources. For this particular embodiment, these receptacles 956/958 are coupled to 115 VAC system 954, and receptacles 956/958 are designed to receive 115 VAC power from a ground source.

AC generator 918 is configured to be driven by RAT 906, and to provide electrical power to a backup bus 930 for the aircraft. In this regard, AC generator 918 can provide backup AC power to the aircraft during flight. For this embodiment, backup bus 930 provides a constant frequency AC power, for example, 230 VAC. In addition, backup bus 930 is coupled to a TRU 960. TRU 960 is configured to convert the constant frequency AC power into an appropriate DC power, for example, 28 VDC. Accordingly, TRU 960 can be used to power any number of loads, subsystems, and/or devices in the 28 VDC system 948.

AC generator 920 is configured to be driven by APU 908, and to provide electrical power to any of the AC buses 932/934/936/938 for the aircraft. Thus, AC generator 920 can service AC loads (not shown) during ground operations and flight as needed.

To summarize, an embodiment of electrical architecture 100 provides ECS functionality, flight deck/cabin temperature control, and cabin pressurization electrically without requiring motor controllers. It also provides engine start functionality electrically without requiring motor controllers. Moreover, the embodiment described herein eliminates large motor controllers and associated High Voltage DC (HVDC) conversion equipment, thereby eliminating the need for a power electronics cooling system. In addition, the embodiment described herein eliminates engine and APU bleed air extraction, realizing benefits comparable to an all-electric architecture without the high cost, complexity, and volume of a traditional all electric system. Electric compressors provide pressurized air for air conditioning, cabin pressurization, engine start (in one embodiment), and certain hydraulic pumps rather than relying on engine bleed air to power these systems. In one embodiment, constant frequency AC power is produced by the engine-driven generators without the use of a traditional constant speed drive found today in all integrated drive generators. In one embodiment, the constant frequency AC generator is used as an engine starter. In another embodiment, engine start can be accomplished via an air turbine starter; rather than obtaining starting air from APU bleed or engine bleed, this air turbine starter can operate from the electric ACS used for cabin pressurization. The electrical generators described herein produce a constant frequency AC power, which can be used to drive small motors directly without the use of a motor controller. Furthermore, the embodiment described herein eliminates equipment bay volume previously needed to house conversion equipment and motor controllers needed for typical all-electric architectures, allowing the potential for increased cargo volumes.

While at least one embodiment has been presented in the foregoing detailed description, it should be appreciated that a vast number of variations exist. It should also be appreciated that the embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical architecture for an aircraft having an engine, the electrical architecture comprising:
   an electrical generator component coupled to the engine, the electrical generator component being configured to receive mechanical power from the engine and to generate a constant frequency AC electrical power from the mechanical power; and
   an air compression system comprising a compressor motor subsystem that lacks a motor controller, the air compression system coupled to the electrical generator component and configured to receive the constant frequency AC electrical power as an input and, in response thereto, produce a pressurized air output having variable characteristics.

2. The electrical architecture of claim 1, the air compression system being configured to produce a pressurized air output having a variable air flow rate.

3. The electrical architecture of claim 1, the air compression system being configured to produce a pressurized air output having a variable air pressure.

4. The electrical architecture of claim 1, the air compression system comprising a compressor motor subsystem that lacks power electronics components.

5. The electrical architecture of claim 1, wherein:
   the engine is a jet engine;
   the electrical generator component is configured to receive shaft power from the jet engine; and
   the electrical generator component is configured to generate the constant frequency AC electrical power from the shaft power.

6. The electrical architecture of claim 1, the air compression system comprising a multi-step compressor architecture.

7. The electrical architecture of claim 1, the air compression system comprising a staged compressor architecture.

8. The electrical architecture of claim 1, the air compression system comprising a variable geometry compressor architecture.

9. The electrical architecture of claim 1, the air compression system comprising an open differential compressor architecture.

10. The electrical architecture of claim 1, the air compression system comprising a multiple motor architecture.

11. The electrical architecture of claim 1, the air compression system comprising a multi-speed motor architecture.

12. An electrical architecture for an aircraft having an engine, the electrical architecture comprising:
    an electrical generator component coupled to the engine, the electrical generator component being configured to receive mechanical power from the engine and to generate a constant frequency AC electrical power from the mechanical power; and
    an air compression system comprising a compressor motor subsystem that lacks power electronics components, the air compression system coupled to the electrical generator component and configured to receive the constant frequency AC electrical power as an input and, in response thereto, produce a pressurized air output having variable characteristics.

13. An electrical architecture for an aircraft having an engine, the electrical architecture comprising:
    an electrical generator component coupled to the engine, the electrical generator component being configured to receive mechanical power from the engine and to generate a constant frequency AC electrical power from the mechanical power; and
    an air compression system comprising one of a multi-step compressor architecture, a staged compressor architecture, a variable geometry compressor architecture, an open differential compressor architecture, a multiple motor architecture and a multi-speed motor architecture, the air compression system coupled to the electrical generator component and configured to receive the constant frequency AC electrical power as an input and, in response thereto, produce a pressurized air output having variable characteristics.

* * * * *